C. H. SMITH.
Spectacles.
No. 1,212.
Patented June 29, 1839.
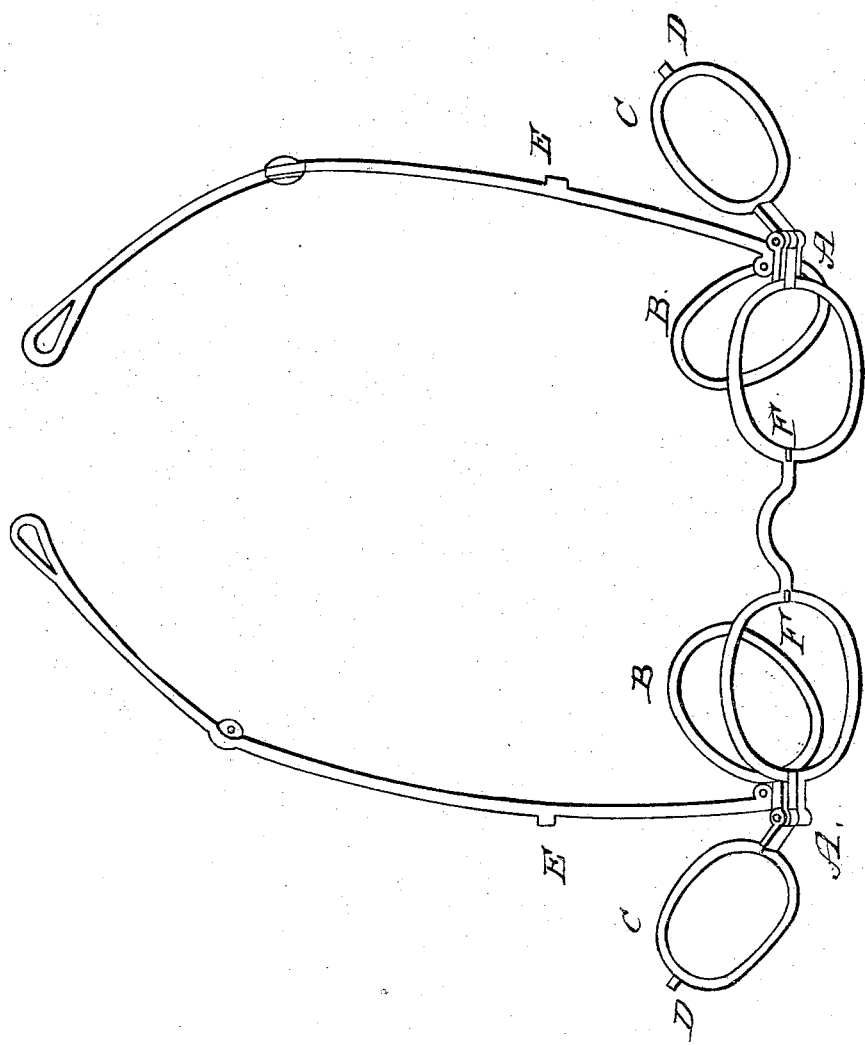

UNITED STATES PATENT OFFICE.

CHRISTOPHER H. SMITH, OF NIAGARA FALLS, NEW YORK.

SPECTACLES.

Specification of Letters Patent No. 1212, dated June 29, 1839.

*To all whom it may concern:*

Be it known that I, CHRISTOPHER H. SMITH, of the village of Niagara Falls, in the county of Niagara and State of New York, have invented a new and useful Improvement in Spectacles; and I do hereby declare that the following is a full and exact description.

The nature of my invention and improvement consists in one pair of revolving glasses and the manner of connecting them to the frame. These spectacles have frames nearly resembling the common spectacles in use A A, but have no glasses fixed in the usual way; but the rims where glasses are usually secured when the glasses are all turned up against the temple bows are unoccupied apertures.

The "revolving spectacles" have two pairs of glasses B, B, and C, C, to every frame. Each pair may be plain, convex or concave, with or without color to suit the person using them. Each pair of glasses is set in rims which are attached to the frame by hinge joints. The hinges of one pair of rims containing glasses B B are immediately within the temple bows, and admit the glasses lying smoothly upon the common frame A A for use or of being turned up against the inside of the temple bows and so being removed from the apertures in the common frame A A. The other pair of glasses C, C, are attached in like manner to the frame on the outside of the temple bows by hinge joints so constructed that they revolve fully three-fourths of a circle, and may at pleasure be turned in front, so as to occupy the apertures in the common frame A A for use, or be turned up on the outside of the temple bows, where they are secured by small spurs D, D, which pass into mortises E, E, which they fit on the outside of the temple bows. The rims containing the outer or revolving glasses C, C, are oval upon their outer surfaces, and a little shorter in their long diameters than the apertures of the common frame that they fit into and a little broader in their short diameters than the apertures of the common frame, which is grooved within, as frames usually are for glasses, so that by gently pressing the rims of the outer revolving glasses they slip into the apertures of the common frames, and are securely fixed in their places by the elasticity of the rims of the common frame A A and the small spurs D, D, which catch into the channels F, F. By this arrangement each pair of glasses may have different focal distances and be of different colors, either pair may be used separately, or both pairs at the same time, producing three different focal distances if necessary and answering all the purposes of three separate, single pairs of glasses.

What I claim as my invention and desire to secure by Letters Patent is—

The employment in spectacles of the revolving glasses C C and the manner of securing them to the rims or apertures of the frame for use, also the mode of securing them to the outside of the temple bows, all substantially as herein described.

Niagara Falls (N. Y.) June 10, 1839.

C. H. SMITH.

Witnesses:
GEO. W. SIMS,
W. E. HULITE.